United States Patent
Zami et al.

(10) Patent No.: US 6,661,553 B2
(45) Date of Patent: Dec. 9, 2003

(54) OPTICAL MODULATOR WHICH OPTIMIZES NRZ MODULATION

(75) Inventors: Thierry Zami, Massy (FR); Denis Penninckx, Nozay (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/216,780

(22) Filed: Aug. 13, 2002

(65) Prior Publication Data

US 2003/0043446 A1 Mar. 6, 2003

(30) Foreign Application Priority Data

Aug. 23, 2001 (FR) ............................................. 01 11046

(51) Int. Cl.[7] .............................. G02F 1/01; G02F 1/035
(52) U.S. Cl. ........................... 359/238; 359/276; 385/3; 385/8; 398/183
(58) Field of Search ............................... 359/238, 239, 359/276; 385/3, 8; 398/79, 183, 187, 188

(56) References Cited

U.S. PATENT DOCUMENTS 5,625,722 A * 4/1997 Froberg et al. ................ 385/1

FOREIGN PATENT DOCUMENTS

WO    WO 00/07317 A1    2/2000

OTHER PUBLICATIONS

Lipinski et al.: "Feedback LF compensation for laser fibre optic transmitter", IEE Proceedings: Optoelectronics, Institution of Electrical Engineers, Stevenage, GB, vol. 145, No. 6, Dec. 15, 1998, pp. 331–334.

Patent Abstracts of Japan vol. 011, No. 209 (E–521), Jul. 7, 1987 & JP 62 030433 A (Oki Electric Ind. Co. Ltd.) Feb. 9, 1987.

* cited by examiner

Primary Examiner—Hung Xuan Dang
Assistant Examiner—Tuyen Tra
(74) Attorney, Agent, or Firm—Sughrue Mion, PLLC

(57) ABSTRACT

The invention provides an optical modulator for transmitting data encoded in NRZ mode by modulating the intensity of a light signal, the modulator including means for shaping the light signal including shaping means for producing a signal of low bandwidth from an input control signal, and a laser modulator having a transfer function favoring the extinction time of the resulting light signal.

5 Claims, 4 Drawing Sheets

OPTICAL MODULATOR WHICH OPTIMIZES NRZ MODULATION

CROSS-REFERENCE TO RELATED APPLICATIONS

This application is based on French Patent Application No. 01 11 046 filed Aug. 23, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the technology of fiber optic transmission and in particular to an optical modulator which improves transmission quality and thereby improves detection of signals transmitted in the presence of noise.

2. Description of the Prior Art

Telecommunication networks have expanded considerably over the last several decades. Although most calls, whether carrying voice (telephone calls) or data, have long used standard telephone lines, which have a low bit rate, the formidable expansion of the Internet and all other data networks, whether in the public or private sector, since the middle eighties has led to an enormous demand for bandwidth. To face up to this exponential increase in the quantity of information to be transported, and which relates to all types of media, i.e. as much to voice as to data, such as electronic mail (E-mail), text and picture file transfer, video distribution and, most importantly, the massive use of the Internet and the World Wide Web (WWW), new technologies have had to be developed, as transmission over electrical media (metal lines, copper) has proved to be too limited in performance over long distances.

At least insofar as the core of these networks is concerned, transmission is now mostly via optical fibers at very high bit rates. The rate of exchange of data, or information bits, is routinely measured in gigabits per second. This means that one billion ($10^9$) bits can be exchanged every second over a 1 Gbit/s line. In practice international standards exist to standardize transmission and to ensure the interworking of equipment. The most widespread of these standards is the SONET (Synchronous Optical NETwork) standard. The SONET standard is primarily a North American standard, and its European counterpart is the SDH (Synchronous Digital Hierarchy) standard. These standards are for the most part mutually compatible and standardize transmission speeds of 2.48 Gbit/s (SONET OC-48), 10 Gbit/s (SONET OC-192) and 40 Gbit/s (SONET OC-768).

Although communication equipment now communicates via a network of optical fibers, which can be very extensive and cover a city or a country, and can include intercontinental transmission, and carries pulses of light generally obtained from a coherent light emitter (laser), it remains the case that the communication equipment itself is still essentially based on electrical technologies and the peripheral circuits that constitute the equipment must be capable of being interfaced efficiently and at low cost to the devices sending and receiving light signals interfaced to the optical fibers.

In its simplest form, binary signals conveying the information bits referred to above are simply transmitted by modulating at two levels the light emitter, usually a laser. Thus the optical signal is generated at two power levels and the laser is switched from a level at which it emits a sufficient quantity of light to be received by the optical receiver situated at the other end of the fiber to a level at which it does not emit any or much light, in which state it must be considered to be turned off. The receiver is thus in a position to discriminate the two levels corresponding to an information bit (a '1' generally corresponding to the state in which the laser is emitting light, although the opposite convention is obviously equally feasible). If the emitter continues to emit between two consecutive '1' and returns to the off state only to transmit a '0', the modulation mode is known as non return to zero (NRZ) modulation. It is cheap and well suited to the mode of operation of lasers, which are turned on or off to transmit each bit of information.

However, with the considerable increase in transmission speeds required for the new generation of communication equipment (up to 40 Gbit/s) it becomes more and more difficult to control turning a laser on or off for a short time and to ensure that the receiver detects correctly the information transmitted, in particular in the presence of noise, which in practice is always present.

Thus the object of the invention is to provide an improved optical modulator which, whilst retaining the simplicity of the NRZ method, makes a significant improvement to it through the possibility of improved detection of the signals transmitted, i.e. by achieving a better signal to noise ratio than the conventional NRZ method.

SUMMARY OF THE INVENTION

The invention therefore provides an optical modulator for transmitting data encoded in NRZ mode by modulating the intensity of a light signal, the modulator including means for shaping the light signal including shaping means for producing a signal of low bandwidth from an input control signal, and a laser modulator having a transfer function favoring the extinction time of the resulting light signal.

According to an important aspect of the invention, the ratio of the transition time of the resulting light signal from a minimum luminous intensity level to a maximum luminous intensity level to the bit time of the signal is from 0.1 to 0.6, and the ratio of the holding time at the maximum intensity level to the total bit time less the transition time between the minimum luminous intensity level and the maximum luminous intensity level is from 0.1 to 0.85.

The aims and objects and the characteristics and advantages of the invention emerge better from the following detailed description of a preferred embodiment of the invention, which is illustrated by the accompanying drawings.

DETAILED DESCRIPTION OF THE PREFERRED EMBODIMENT

Figure 1:
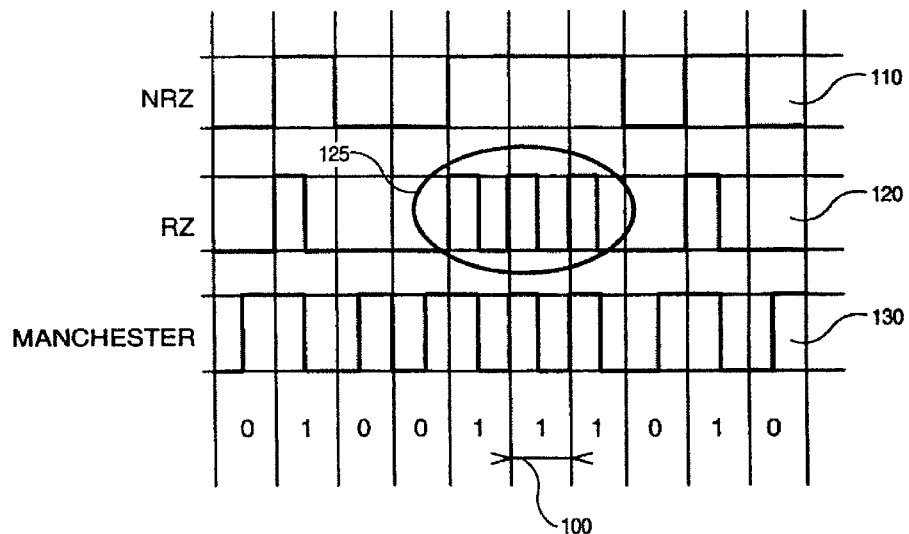
FIG. 1 is a diagram comparing the NRZ modulation mode with other modulation modes.

The essential function of FIG. 1 is to compare NRZ modulation (110) with other types of modulation in order for the reader to better appreciate the simplicity and the low cost that result from its use in communication products. In particular, it can be compared to a second modulation mode known as the return to zero (RZ) mode (120). In contrast to the NRZ mode, at the time of the succession of a transmission of '1' levels, the device emitting the light signals is turned on and then off in each bit period (100). This obviously results in a greater number of transitions (125) in the signal to be transmitted, which corresponds to a spreading of the transmitted energy over a wider range of frequencies, a phenomenon familiar to persons skilled in the art and which is shown clearly by the spectral analysis of such signals using appropriate measuring equipment. In other words, the propagation medium, in this instance the optical fiber, and the receiver must be able to transmit and receive modulation comprising components at higher frequencies, and therefore offer better performance, if the signals are not to be degraded. Another type of modulation that is often used is two-phase or Manchester code modulation (130). It comprises an even greater number of transitions since there is at least one transition in each '1' or '0' bit period. The spectral components of this modulation mode are therefore even more oriented toward high frequencies and the resulting drawbacks are more accentuated. Thus, whenever possible, the NRZ modulation mode is preferred, for its simplicity and its low cost of implementation.

Figure 2:
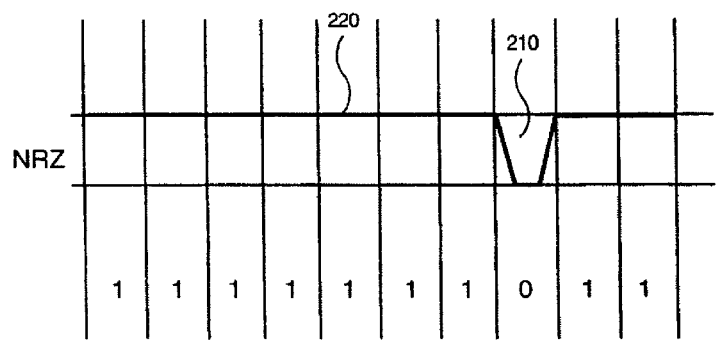
FIG. 2 shows a weakness of the conventional NRZ modulation mode, for which the invention provides a remedy.

However, FIG. 2 shows a problem of NRZ modulation, in particular when a '0' symbol (210) must be transmitted in a long series of '1' symbols (220). Because of the interaction between the symbols, especially beyond the electrical filter in the receiver, the turning off of the light emitter is not so sharp, which therefore makes detection of the isolated '0' symbol by the remote receiver more difficult. In other words, the extinction rate of the signal after electrical filtering is degraded. The invention therefore proposes to improve NRZ modulation from this point of view in order to widen its field of application, thereby avoiding the need to use other modulation modes, such as RZ modulation, which although it achieves clear separation of '1' symbols where the emitter is active, nevertheless has the drawbacks previously cited.

Figure 3A:
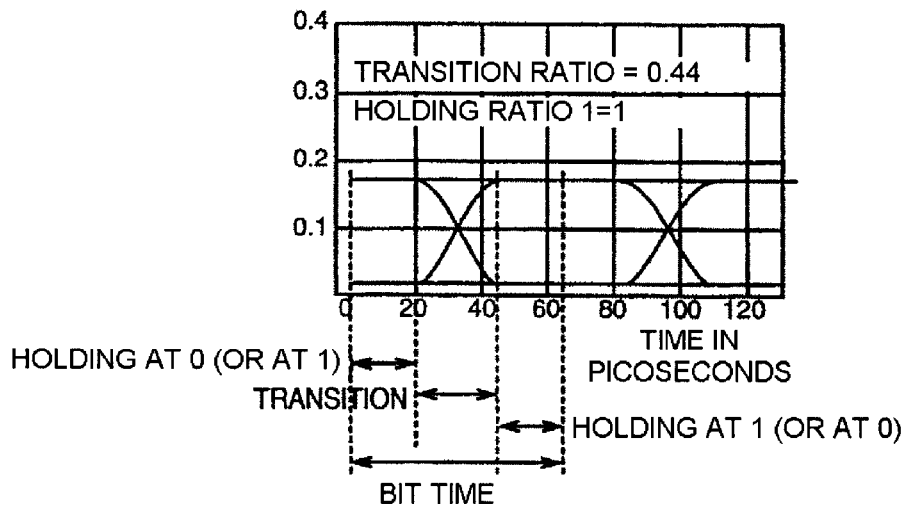
FIGS. 3A, 3B, 3C are diagrams showing how the NRZ mode is modified in accordance with the invention.
Figure 3B:
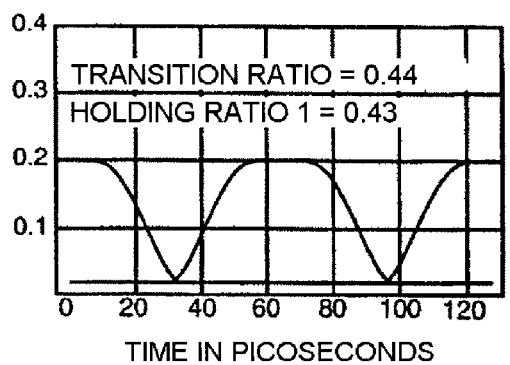
Figure 3C:
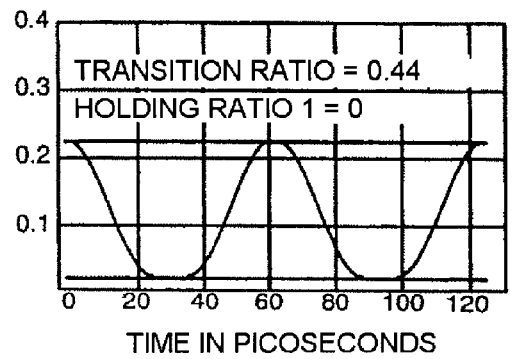

FIGS. 3A, 3B, 3C show how the signals transmitted must be modified in accordance with the invention to obtain a better extinction rate. FIG. 3A corresponds to the standard case of an NRZ modulation signal in which the '0' and '1' holding times are equal, i.e. when the holding at 1 ratio is equal to 1, the holding at 1 ratio being defined as follows:

$$\text{Holding at 1 ratio} = \frac{2 \times \text{holding at 1 time}}{\text{Bit time} - \text{Transition time}}$$

The transition ratio, representing the fraction of the bit time needed to change from one level to the other, and equal to 0.44 in FIG. 3A, is defined as follows:

$$\text{Transition ratio} = \frac{\text{Transition time}}{\text{Bit time}}$$

The invention therefore induces a greater or lesser deformation of the holding time to maintain the signal at the '0' level for longer and thereby to increase the extinction time of the optical transmission device. This is shown in FIGS. 3B and 3C at different levels. Thus FIG. 3B shows a signal with a holding at 1 ratio equal to 0.43 and FIG. 3C shows a situation in which the ratio is 0.

Figure 4:
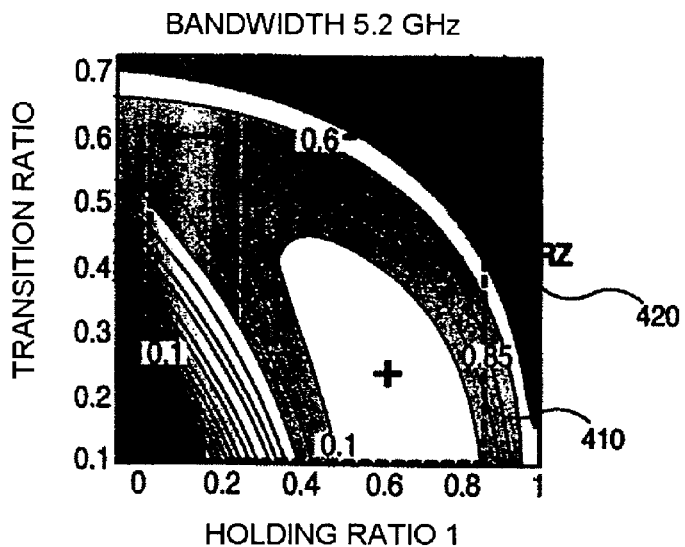
FIG. 4 is a diagram representing the signal to noise ratio, which can also be used to assess the improvement obtained.

The advantage obtained must be quantified precisely by appropriate measurements carried out by persons skilled in the optical transmission art. Thus FIG. 4 shows the limit OSNR yielding a floor error rate of $10^{-9}$ as a function of the equivalent noise band of the electrical filter in the receiver on detecting a signal modulated in the mode according to the invention at a bit rate of 10 Gbit/s. For this figure the transition ratio is 0.3. It is important for this value to be identical for both of the modulation modes compared because it shows well that in both cases the modulator has exactly the same speed. For a holding at 1 time equal to 0.5 the curve shows that the limit value of the OSNR is 0.5 dB lower than that obtained for a signal modulated in the conventional NRZ mode (holding at 1 time equal to 1 represented by the curve). These curves are applicable for any bit rate provided that the ratio between the equivalent noise band and the base frequency of the bit rate is complied with. Thus it is also possible to say that the modulation mode according to the invention facilitates optimizing optoelectronic receivers because they then have a greater tolerance to optical noise for a smaller equivalent noise band.

Figure 5:
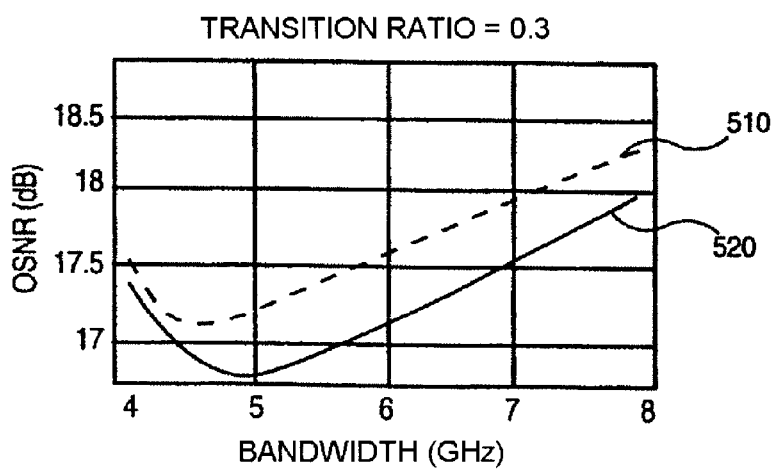
FIG. 5 is a diagram showing how the improvement obtained can be quantified precisely by measuring the optical transmission quality factor.

The advantage obtained can also be assessed by a standard measurement of optical transmission quality. This factor is called the transmission quality factor or Q factor. Standard measuring instrumentation can in particular plot curves like those shown in FIG. 5 in which the quality factor is expressed as a function of the holding at 1 ratio and as a function of the transition ratio. The optimum equivalent noise band is chosen for this figure, i.e. 5 GHz for a modulated signal at 10 Gbit/s. FIG. 5 shows clearly to persons skilled in the optical transmission art that there is an area in accordance with the invention in which the quality factor is improved, i.e. increased, compared to that obtained with standard NRZ modulation, shown in the graph for the purposes of comparison. This is achieved for ranges of transition ratio and holding at 1 time which differ from those of the ordinary method and it is therefore advantageous to use them to improve transmission using NRZ modulation. This area, determined by a holding at 1 ratio, is from 0.1 to 0.85 (on the abscissa axis), for a transition rate from 0.1 to 0.6 (on the ordinate axis).

Figure 6:
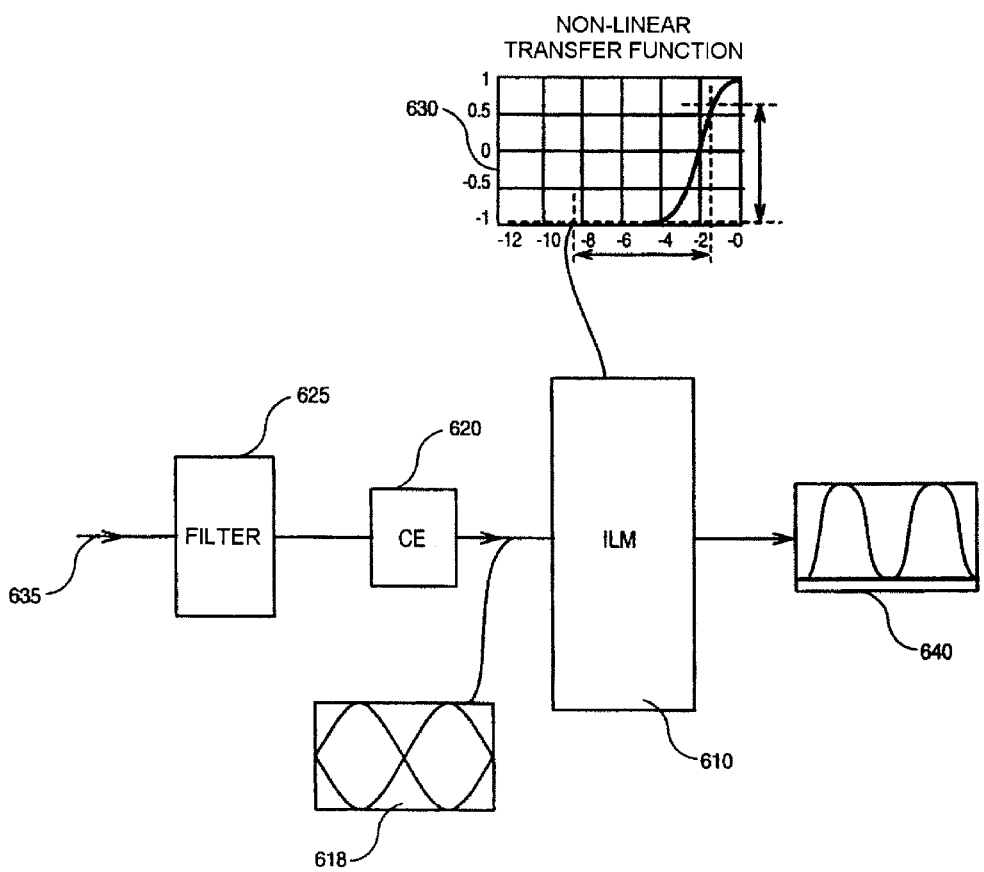
FIG. 6 is a block diagram showing the general implementation of the invention.

FIG. 6 shows how the invention can be implemented generally, on the understanding that numerous variants that do not depart from the scope of the invention will be evident to the skilled person. The light emitter (610) is here an integrated laser modulator (ILM). This device receives a control signal (618) supplied by the electrical control unit (620) to shape the signal at the modulator input. According to the invention, this signal must have a small bandwidth, given the speed of transmission, in particular with a controlled transition time. This is preferably obtained by appropriate means such as an analog or digital electrical filter (625), for example a fifth order Bessel filter for transforming in accordance with the principles of the invention the data signal (635) generated by upstream control logic. In this preferred embodiment of the invention, the ILM is characterized by a non-linear transfer function (630) and produces a resultant optical signal (640) having all the required characteristics, as discussed hereinabove. When NRZ modulation is used in accordance with the above principles, these characteristics extend its use beyond its traditional fields of application.

The system uncovered by the invention improves transmission quality on an optical fiber using the NRZ modulation mode. Although there are other modulation modes offering better performance, the NRZ mode is the simplest to implement and therefore the most economic, and the mode of choice for large-scale use. The invention is very suitable for controlling light emitters in the form of lasers which must simply be turned off or on according to whether a '1' or '0' level must be transmitted. By shaping the optical signal appropriately, the invention compensates the intrinsic weakness of the NRZ mode when it is necessary to transmit an isolated '0' level in a series of '1' levels and which therefore becomes more difficult to detect.

There is claimed:

1. An optical modulator for transmitting data encoded in NRZ mode by modulating the intensity of a light signal, said modulator including means for shaping said light signal including:

shaping means for producing a signal of low bandwidth from an input control signal, and a laser modulator having a transfer function favoring the extinction time of the resulting light signal.

2. The optical modulator claimed in claim 1 wherein:

the ratio of the transition time of said resulting light signal from a minimum luminous intensity level to a maximum luminous intensity level to the bit time of said signal is from 0.1 to 0.6, and the ratio of the holding time at said maximum intensity level to the total bit time less said transition time between said minimum luminous intensity level and said maximum luminous intensity level is from 0.1 to 0.85.

3. The optical modulator claimed in claim 1 wherein said shaping means include an analog or digital electrical filter.

4. The optical modulator claimed in claim 3 wherein said filter is a fifth order Bessel filter.

5. The optical modulator claimed in claim 3 wherein said shaping means further include an electrical control unit for shaping the output signal of said electrical filter.

* * * * *